D. F. McDONELL.
NUT LOCK.
APPLICATION FILED JULY 28, 1908. RENEWED AUG. 11, 1909.
936,929.  Patented Oct. 12, 1909.
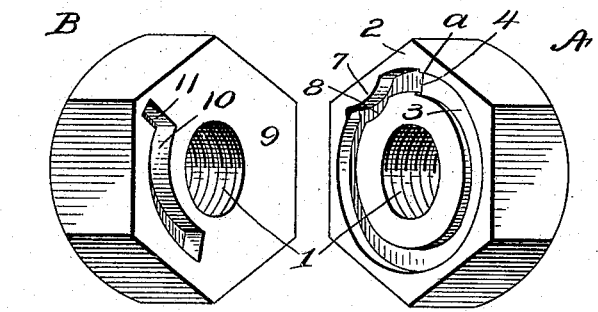
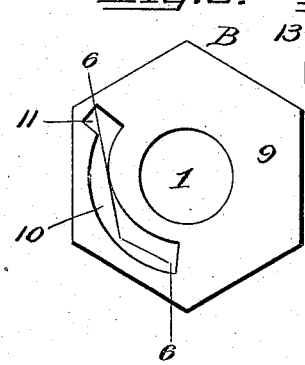 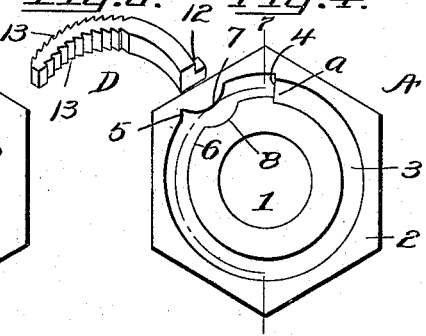
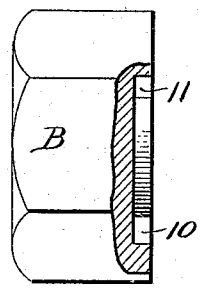 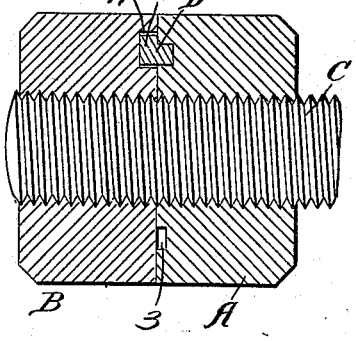 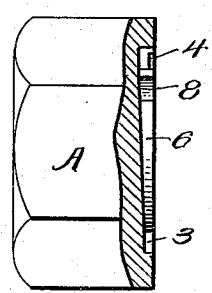
Witnesses
F. C. Gibson.
C. Bradway.
Inventor
Dan F. McDonell
By Victor J. Evans
Attorney

UNITED STATES PATENT OFFICE.

DAN F. McDONELL, OF MINERAL, WASHINGTON.

NUT-LOCK.

936,929.     Specification of Letters Patent.     Patented Oct. 12, 1909.

Application filed July 28, 1908, Serial No. 445,766. Renewed August 11, 1909. Serial No. 512,457.

*To all whom it may concern:*

Be it known that I, DAN F. McDONELL, a citizen of the United States, residing at Mineral, in the county of Lewis and State of Washington, have invented new and useful Improvements in Nut-Locks, of which the following is a specification.

This invention relates to nut locks of that type in which the nut is made in two sections, one for jamming the other tightly on the bolt, the parts being so designed as to be automatically clamped together by a key.

The invention has for one of its objects to improve and simplify the construction and operation of devices of this character so as to be comparatively simple and inexpensive to manufacture, efficient in use, and readily manipulated.

Another object of the invention is the provision of a nut lock in which one of the parts is provided with an approximately annular groove, the depth of which gradually increases from a given point correspondingly with the pitch of the threads of the bolt on which the nut is applied, while the other part carries an annular key which turns therewith and is adapted to enter the groove and is jammed therein by a hump formed in the wall of the groove so as to distort the key and thus lock the parts of the nut together.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figures 1 and 2 are perspective views of the two parts of the nut. Fig. 3 is an elevation showing the inner face of the jam portion of the nut. Fig. 4 is a similar view of the main portion of the nut. Fig. 5 is a central longitudinal section of the nut clamped to a bolt. Figs. 6 and 7 are side elevations of the two parts of the nut with portions in section on line 6—6 and 7—7, Figs. 3 and 4, respectively. Fig. 8 is a perspective view of a locking key.

Similar reference characters are employed to designate corresponding parts throughout the several views.

Referring to the drawing, A designates the main section of the nut, and B, the auxiliary or jamming section thereof which are substantially similar in general form and are provided with bores 1 of the same diameter and threaded so as to screw on an ordinary bolt or the like C, the threaded portion of which is shown in Fig. 5. The main section A of the nut is provided in the face 2 on which the jam section B bears with an approximately annular groove 3 which begins at *a* and gradually increases in depth until the opposite end is approached, the change in depth being substantially in accordance with the pitch of the thread of the bolt C, there being an abrupt shoulder 4 formed at the deep end of the groove. Adjacent the deep end of the groove the opposed walls thereof 5 and 6 are provided, respectively, with an arcuate hump 7 and depression 8 for the purpose hereinafter to appear. In the inner face 9 of the jam section B is an approximately arcuate groove 10 that terminates in an offset or recess 11 for receiving the key D. This key is shaped to enter the pocket 10 and has one end formed into a lip 12 which enters the recess 11 so that the key will positively turn with the jam section B. The key is of such thickness as to project beyond the face 9 when the key is entered in the pocket 10 so that the projecting portion of the key will enter the annular groove 3 of the main section A of the nut. The opposite concentric faces of the arcuate key are provided with serrations 13 for increasing the grip of the key in the groove 3, when the parts are finally locked together.

In practice, the main section A is applied to the bolt, threaded rod or other part C and after being screwed home the jam section B is applied after the key D has been seated in the pocket 10. As the jam section of the nut approaches the main section A, the projecting portion of the key enters the groove 3 and, upon encountering the hump 7, is bent laterally until the end of the key strikes the shoulder 4. The distortion of the key by the hump positively prevents the jam section of the nut from being jolted loose and the key, being preferably made of soft metal, will yield to pressure applied to the jam section by a wrench when the nut is to be taken off.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claims.

Having thus described the invention, what I claim is:—

1. A nut lock comprising separate sections arranged in contact and provided with threaded bores, an approximately circular groove in the inner face of one of the sections whose depth increases from a given point substantially the same as the pitch of the thread of the bore of such section, a key detachably connected with the other section and adapted to enter the said groove, and means for distorting or bending the key when the sections are jammed together for preventing relative turning of the sections.

2. A nut lock comprising two sections, one section having an annular groove of varying depth, the opposed walls of the groove having, respectively, a hump and a depression opposite the hump, the other section having an arcuate pocket struck on substantially the same radius as the groove of the other section, and a key removably fitted in the pocket and projecting out of the latter to enter the said annular groove, said key being of bendable material to be distorted by the said hump and depression during the relative turning of the sections of the nut.

3. A nut lock comprising a main section having in one of its transverse faces an annular groove arranged concentrically with respect to the bore of the nut and of gradually increasing depth to form a shoulder between the deepest and shallowest parts of the groove, one wall of the groove having a hump and the opposite wall a depression opposed to the hump, a jam section having one of its transverse faces provided with an arcuate pocket terminating in a recess at one end, and an arcuate key set into the pocket and having a lip at one end for engaging in the recess, the key projecting out of the pocket to engage in the annular groove to be distorted by the said hump into the depression and for striking the said shoulder to limit the turning of the jam section.

In testimony whereof I affix my signature in presence of two witnesses.

DAN F. McDONELL.

Witnesses:
   THOS. W. LITTLE,
   MARY C. NASLUND.